(12) United States Patent
Morozov et al.

(10) Patent No.: US 11,886,022 B2
(45) Date of Patent: Jan. 30, 2024

(54) BEAM EXPANDER AND BEAM EXPANSION METHOD

(71) Applicant: SAMSUNG ELECTRONICS CO., LTD., Suwon-si (KR)

(72) Inventors: Aleksander V. Morozov, Moscow (RU); Sergey E. Dubynin, Moscow (RU); German B. Dubinin, Moscow (RU); Chilsung Choi, Suwon-si (KR); Hongseok Lee, Seoul (KR); Hoon Song, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 56 days.

(21) Appl. No.: 17/520,251

(22) Filed: Nov. 5, 2021

(65) Prior Publication Data

US 2022/0146764 A1    May 12, 2022

(30) Foreign Application Priority Data

Nov. 6, 2020   (RU) ................................. 2020136544
May 12, 2021  (KR) ......................... 10-2021-0061636

(51) Int. Cl.
| | | |
|---|---|---|
| *G02B 6/42* | (2006.01) | |
| *G02B 6/34* | (2006.01) | |
| *G02B 6/13* | (2006.01) | |

(52) U.S. Cl.
CPC .............. *G02B 6/4214* (2013.01); *G02B 6/13* (2013.01); *G02B 6/34* (2013.01); *G02B 6/4206* (2013.01); *G02B 6/4207* (2013.01)

(58) Field of Classification Search
CPC .......... G02B 6/4214; G02B 6/13; G02B 6/34; G02B 6/4206; G02B 6/4207
See application file for complete search history.

(56) References Cited

U.S. PATENT DOCUMENTS

| | | |
|---|---|---|
| 3,950,707 A | 4/1976 | Hill et al. |
| 5,208,685 A | 5/1993 | Aleksoff et al. |
| (Continued) | | |

FOREIGN PATENT DOCUMENTS

| | | |
|---|---|---|
| CN | 1672086 A | 9/2005 |
| CN | 101500477 B | 1/2012 |
| (Continued) | | |

OTHER PUBLICATIONS

Communication dated Apr. 16, 2021 by the Russian Patent Office for Russian Patent Application No. 2020136544.

*Primary Examiner* — Michael P Mooney
(74) *Attorney, Agent, or Firm* — Sughrue Mion, PLLC

(57) ABSTRACT

There is provided a beam expander including a first optical element, a second optical element, a composite waveguide including a plurality of waveguide elements, and a dichroic coating provided between the plurality of waveguide elements. The first optical element inputs a collimated incident beam from the outside into the composite waveguide, and the second optical element outputs, from the composite waveguide, collimated incident beam, input to the composite waveguide, wherein the collimated incident beam input into the composite waveguide is divided into multiple wavefronts by the dichroic coating, and the multiple wavefronts are mixed by total internal reflection in the composite waveguide. When the beam expander is used, coherency and collimation of an output beam may be maintained and speckles may be reduced or eliminated while improving the efficiency of an optical system.

20 Claims, 6 Drawing Sheets

(56) References Cited

U.S. PATENT DOCUMENTS

| | | |
|---|---|---|
| 6,713,772 B2 | 3/2004 | Goodman et al. |
| 7,411,715 B2 | 8/2008 | Lazarev et al. |
| 7,463,664 B2 | 12/2008 | Mizuuchi et al. |
| 7,708,945 B1 | 5/2010 | Abel et al. |
| 8,665,178 B1 | 3/2014 | Wang |
| 8,743,922 B2 | 6/2014 | Smeeton et al. |
| 9,158,178 B2 | 10/2015 | Smeeton et al. |
| 9,464,779 B2 | 10/2016 | Popovich et al. |
| 2002/0044285 A1 | 4/2002 | Pedersen et al. |
| 2002/0074513 A1 | 6/2002 | Abel et al. |
| 2003/0138208 A1 | 7/2003 | Pawlak et al. |
| 2003/0161022 A1 | 8/2003 | Lazarev et al. |
| 2004/0046128 A1 | 5/2004 | Abel et al. |
| 2004/0130790 A1 | 7/2004 | Sales |
| 2010/0185106 A1 | 7/2010 | Suijver et al. |
| 2017/0285348 A1* | 10/2017 | Ayres .................. G02B 6/0055 |
| 2017/0329140 A1 | 11/2017 | Yeoh et al. |
| 2018/0374266 A1 | 12/2018 | Schowengerdt et al. |
| 2020/0089014 A1 | 3/2020 | Peng et al. |
| 2020/0142298 A1 | 5/2020 | Valentine et al. |
| 2020/0278498 A1 | 9/2020 | Schultz et al. |

FOREIGN PATENT DOCUMENTS

| | | |
|---|---|---|
| CN | 103064228 B | 6/2016 |
| RU | 2762176 C1 | 12/2021 |
| WO | 03/044591 A1 | 5/2003 |
| WO | 2008/018001 A2 | 2/2008 |

* cited by examiner

BEAM EXPANDER AND BEAM EXPANSION METHOD

CROSS-REFERENCE TO RELATED APPLICATIONS

This application is based on and claims priority under 35 U.S.C. § 119 to Korean Patent Application No. 10-2021-0061636, filed on May 12, 2021, in the Korean Intellectual Property Office and Russian Patent Application No. 2020136544, filed on Nov. 6, 2020, in the Russian Patent Office, the disclosures of which are incorporated by reference herein in their entirety.

BACKGROUND

1. Field

The disclosure relates to beam expanders and beam expansion methods, and more particularly, to beam expanders and beam expansion methods, which are applicable to three-dimensional (3D) image-generating apparatuses, holographic display devices, and the like.

2. Description of the Related Art

An optical system such as a holographic display device that generates a three-dimensional (3D) image may include a beam expander that is an optical device that expands a dimension of a received collimated beam. In order to improve the efficiency of the beam expander, miniaturization of the size (e.g., thickness) of a device to which the beam expander is applied, improvement of homogenization of a beam output from the beam expander, ensuring a beam output from the beam expander has a certain cross-section having a predetermined shape and dimensions, and speckle contrast reduction, etc., need to be implemented. The speckle refers to a random interference pattern due to mutual interference of coherent beams having random phase shifts and/or random intensities.

In addition, the beam expander needs to output a beam having a cross-section with a certain shape and having improved homogeneity, have a sufficiently miniaturized size, reduce speckle contrast, and maintain coherency of an output beam, and needs to produce the same effect as using a plurality of light sources without any special adjustment for a given light source.

When a related art beam expander is used, it may be difficult to secure high homogeneity of a laser beam while maintaining coherency of the laser beam. In addition, the cross-section of an incident beam input to the related art beam expander has circular or elliptical symmetry. In this case, it may be difficult to secure the homogeneity of the incident beam while maintaining the coherency of the incident light and the efficiency of a system (e.g., minimization of energy loss), and to form the cross-sectional shape and size of the incident beam as desired. Furthermore, when a coherent laser beam is used, a speckle pattern may be generated due to random interference of waves scattered from an optically coarse surface.

The patent document U.S. Patent Application Publication No. 20040130790 A1 (Tasso Sales, Aug. 7, 2004) discloses a random microlens array for beam shaping and homogenization. According to this patent document, a microlens array includes different microlens elements according to a probability distribution. When the microlens array disclosed in this patent document is used, it is possible to shape a beam having a predetermined intensity profile within a desired far-field scatter pattern. Between microlenses, there may be differences in irregular variations in a microlens surface profile, a boundary profile corresponding to a boundary of the microlens, and a spatial distribution corresponding to a positional relationship of microlenses in the microlens array. The microlens surface profile may be used to homogenize the intensity profile of a beam. A boundary profile variation within an irregular distribution of microlenses included in a microlens array may be used to apply a predetermined beam intensity profile within a desired scattering pattern. However, when a microlens array as described above is used, a non-collimated output beam may be generated, the coherency of a beam may be lost, and the cross-section formation and homogenization of a beam may be possible only on one plane. Furthermore, a microlens array as described above may not be able to suppress a clearly formed speckle when a laser beam is used, and may have to be implemented in a device having a relatively large size.

On the other hand, the patent document U.S. Pat. No. 9464779 B2 (Popovich et al., Nov. 10, 2016) discloses an optical device for condensing beams of multiple light sources by using a Bragg's grating for sequential color illumination. The optical device may include a first light source, a second light source, a condensing lens, and a Bragg's grating assembly including one or more Bragg's gratings. The condensing lens directs a beam from the first light source and a beam from the second light source to the Bragg's grating assembly at a first angle of incidence and a second angle of incidence, respectively. The Bragg's grating assembly diffracts the beam from the first light source and the beam from the second light source in a common direction. The Bragg's grating is, for example, an electrically switchable Bragg's grating, and the first and second light sources may be light-emitting diodes (LEDs) or laser diodes. The optical device may include an illumination system formed by a plurality of light sources and an electrically switchable Bragg's grating to collect and homogenize a beam. When an optical device including such a Bragg's grating is used, problems may arise, such as time split light homogenization, haze effect due to the use of a switchable Bragg's grating, difficulty in precise alignment of components included in the system, non-integrated solution, and limitations on miniaturization of hardware components.

SUMMARY

Provided are beam expanders and beam expansion methods.

Provided are beam expanders and beam expansion methods for improving the homogenization of an output beam, ensuring the output beam has a certain cross-section with a predetermined shape and dimensions, reducing speckle contrast, and maintaining coherency of the output beam, and for bringing about the same effect as using a plurality of light sources without any special adjustment for a given light source.

Additional aspects will be set forth in part in the description which follows and, in part, will be apparent from the description, or may be learned by practice of the presented embodiments of the disclosure.

According to an aspect of the disclosure, there is provide a beam expander including: a first optical element; a second optical element; a composite waveguide including a plurality of waveguide elements each having a form of a substrate; and a dichroic coating provided between the plurality of waveguide elements, wherein the first optical element is configured to input a collimated incident beam from outside the beam expander into the composite waveguide, and the second optical element is configured to output, from the composite waveguide, the collimated incident beam, input to the composite waveguide, wherein the collimated incident beam input into the composite waveguide is divided into a plurality of wavefronts by the dichroic coating, and the plurality of wavefronts are mixed by total internal reflection in the composite waveguide.

The second optical element may be configured to output, from the composite waveguide, a beam having a specific cross-sectional shape and beam homogeneity in a collimated state with coherency.

At least one of the first optical element or the second optical element may include a diffractive optical element.

At least one of the first optical element or the second optical element may include a holographic optical element.

The beam expander may further include at least one light source.

The at least one light source may include a laser diode.

At least one of the first optical element or the second optical element may include a volume Bragg's grating.

The dichroic coating may have a multilayer dielectric coating structure.

The dichroic coating may have a multilayer interference mirror structure.

The plurality of waveguide elements may include: a first waveguide element; a second waveguide element adjacent to the first waveguide element; and a third waveguide element adjacent to the second waveguide element, and wherein the dichroic coating may include: a first dichroic coating provided between the first waveguide element and the second waveguide element; and a second dichroic coating provided between the second waveguide element and the third waveguide element.

A transmittance characteristic of the first dichroic coating may be different from a transmittance characteristic of the second dichroic coating.

A reflectance characteristic of the first dichroic coating may be different from a reflectance characteristic of the second dichroic coating.

According to another aspect of the disclosure, there is provided a beam expansion method including: inputting a collimated incident beam into a composite waveguide through a first optical element; dividing the collimated incident beam into a plurality of wavefronts inside the composite waveguide, and mixing the plurality of wavefronts through total reflection in the composite waveguide; and outputting a beam, obtained by mixing the plurality of wavefronts inside the composite waveguide, from the composite waveguide through a second optical element.

The beam may have a specific cross-sectional shape and beam homogeneity in a collimated state with coherency.

At least one of the first optical element or the second optical element may include a diffractive optical element.

At least one of the first optical element or the second optical element may include a holographic optical element.

The beam output from the composite waveguide may travel with a divergence angle of less than about 0.25°.

According to another aspect of the disclosure, there is provided a beam expander including: a first optical element configured to receive a collimated incident beam; a composite waveguide configured to: receive the collimated incident beam through the first optical element, split the collimated incident beam into a plurality of wavefronts, and mix the plurality of wavefronts through total reflection in the composite waveguide; and a second optical element config- ured to output a beam obtained by mixing the plurality of wavefronts inside the composite waveguide.

The beam expander may further include a plurality of waveguide elements arranged in a stacked structure.

The beam expander may further include a dichroic coating provided between adjacent waveguide elements among the plurality of waveguide elements.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
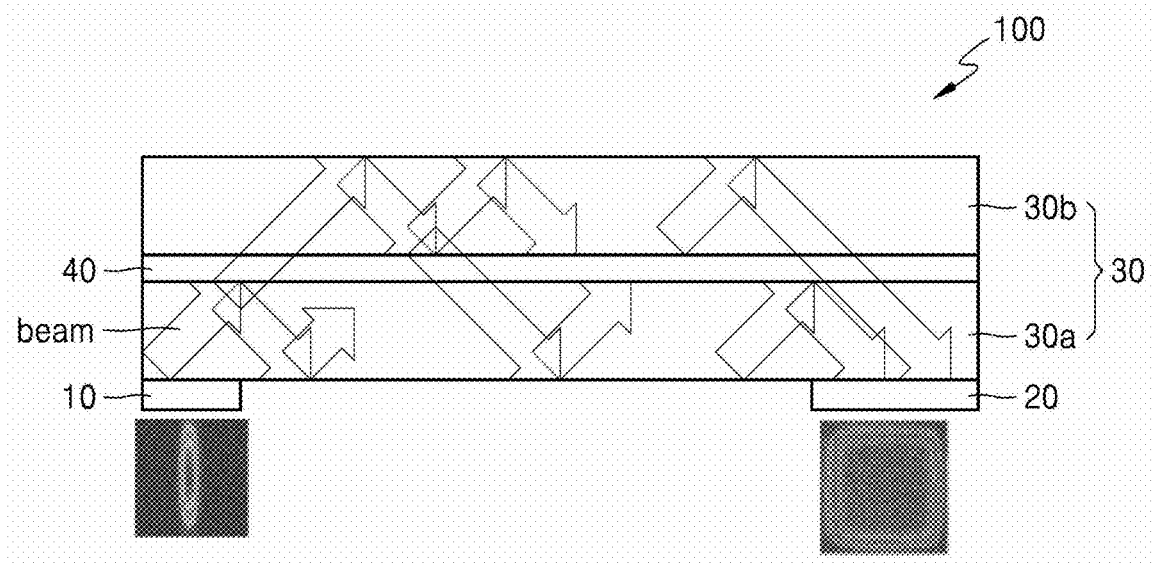
FIG. 1 schematically illustrates an example configuration of a beam expander according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

In the drawings, the size or thickness of each component may be exaggerated for clarity and convenience.

Although the terms "first", "second", etc., may be used herein to describe various elements, components, regions, and/or layers, these elements, components, regions, and/or layers should not be limited by these terms. These terms are used only to distinguish one component from another, not for purposes of limitation.

Hereinafter, what is described as "on" or "over" may include not only that which is directly above in contact, but also that which is above in a non-contact manner. As used herein, the singular forms "a", "an" and "the" are intended to include the plural forms as well, unless the context clearly indicates otherwise.

When a part is said to "include" a component, this means that other components may be further included instead of excluding other components, unless otherwise stated.

The use of the term "above-described" and similar indication terms may correspond to both singular and plural.

FIG. 1 schematically illustrates an example configuration of a beam expander 100 according to an example embodiment.

The beam expander 100 of FIG. 1 may improve the homogeneity of an output beam and allow the output beam to have a desired cross-sectional shape. The beam expander 100 may reduce the speckle contrast of the output beam and maintain coherency and collimation of the output beam, without the need to adjust components included in the beam expander 100. Also, the beam expander 100, which expands a beam from one light source, may bring about the same effect as using a plurality of light sources without any special adjustment for a given light source.

The speckle contrast may be reduced by superimposing a plurality of phases. That is, the speckle contrast of the output beam may be reduced by superimposing beams generated by splitting into a plurality of branches inside the beam expander 100.

Also, efficiency of beam homogenization may be increased by a dichroic coating 40 included in the beam expander 100. As a beam is split by the dichroic coating 40, multiple wavefronts that overlap each other may be generated, and thus, the cross-section of the output beam may be formed to have a desired shape. For example, the cross-sectional shape of a beam at the output side of the beam expander 100 may be formed as desired by shifting multiple wavefronts.

Furthermore, as the dichroic coating 40 and a plurality of waveguide elements 30a and 30b, which have various characteristics, are selected, a beam input to a composite waveguide 30 may be split into multiple wavefronts in various ways. For example, a beam may be split between the plurality of waveguide elements 30a and 30b according to power, while continuous redistribution and mixing are performed on different wavefronts. According to an example embodiment, the plurality of waveguide elements 30a and 30b are different from each other. In addition, a beam may be split between the plurality of waveguide elements 30a and 30b, which are different from each other, according to power while beams are mixed only at the output side of the composite waveguide 30. Furthermore, a beam may be split between the plurality of waveguide elements 30a and 30b according to the wavelength of the beam.

The composite waveguide 30 may provide a plurality of beam traveling paths, split an input beam into several weaker beams according to power, and shift the weaker beams relative to each other in space. Accordingly, the dimension of the cross-section of the beam may increase from an input dimension to a dimension corresponding to the size of the surface of a second optical element 20. In addition, as the plurality of beam traveling paths are generated by the composite waveguide 30, speckle contrast may be reduced. This may be because the phases of all rays constituting an incident beam are averaged in a plane of the second optical element 20.

Referring to FIG. 1, the beam expander 100 according to an example embodiment may include a first optical element 10, the second optical element 20, and the composite waveguide 30 (a composite waveguide). According to an example embodiment, the beam expander 100 may further include a light source. The light source may be, for example, a light source emitting a coherent beam. For example, the light source may include a laser diode. A laser beam emitted from the light source may have different electric field and light distribution profiles in a beam cross-section. For example, the laser beam emitted from the light source may include one of a Gaussian beam, a multimode beam, a flat-top beam, a super Gaussian beam (annular-shape beam), and a Laguerre-Gaussian beam. A coherent beam from the light source may have a certain cross-sectional distribution of three components: blue (wavelength of about 460 nm), red (wavelength of about 640 nm), and green (wavelength of about 515 nm). As such, the certain cross-sectional distribution of the three components in the coherent beam from the light source is exemplary and only one of possible variations of a component and wavelength distribution. However, the disclosure is not limited thereto, and the light source may be separately provided outside the beam expander 100.

The light source may generate a coherent collimated beam having a given intensity distribution in a plane of the first optical element 10. In this case, the first optical element 10 may serve as optical gratings for inputting an incident coherent beam to the composite waveguide 30. The second optical element 20 may be configured to output beams from the plurality of waveguide elements 30a and 30b included in the composite waveguide 30 and collect all the output beams. The second optical element 20 may allow the output beam to have a high level of collimation and homogeneity, and a desired cross-sectional shape and low speckle contrast.

The composite waveguide 30 may include a structure in which a plurality of substrates are stacked. The plurality of substrates included in the composite waveguide 30 may have a pre-calculated thickness ratio. Wavefront propagation paths may be variously changed by the plurality of substrates having the pre-calculated thickness ratio, the plurality of substrates being included in the composite waveguide 30. By solving an optimization problem by considering an energy loss value or the interference of beams occurring at the interface between the plurality of substrates and by considering the entire thickness of the composite waveguide 30, the number of substrates included in the composite waveguide 30 may be calculated. In this case, the plurality of substrates may be referred to as a plurality of waveguide elements 30a and 30b (component waveguides). Although it is illustrated in FIG. 1 that the number of waveguide elements 30a and 30b are two, the disclosure is not limited thereto, and the number of waveguide elements 30a and 30b may be three or more.

The plurality of waveguide elements 30a and 30b may include the same or different optical materials (e.g., glass, polymeric material, crystal, etc.). Also, the plurality of waveguide elements 30a and 30b may have different thicknesses. Furthermore, the plurality of waveguide elements 30a and 30b may have different refractive indices. The characteristics of the composite waveguide 30 may vary depending on a combination of the plurality of waveguide elements 30a and 30b.

The plurality of waveguide elements 30a and 30b may be coupled to each other by an optically transparent adhesive, an optical contact, and/or an optically transparent immersion using an immersion liquid. In this case, in order to reduce unwanted effects that may occur at an interface between the plurality of waveguide elements 30a and 30b, the immersion liquid used in the optically transparent immersion may be selected to fill an air gap that may occur between the plurality of waveguide elements 30a and 30b and to have optical parameters closest to the optical parameters of the plurality of waveguide elements 30a and 30b.

The composite waveguide 30 may further include the dichroic coating 40 provided at an interface between the plurality of waveguide elements 30a and 30b. The plurality of waveguide elements 30a and 30b may be separated from each other by the dichroic coating 40. As described below, an incident beam may be input into the composite waveguide 30 by the first optical element 10. For example, the incident beam may be input into the composite waveguide 30 through the first optical element 10. A beam input into the composite waveguide 30 may be split into multiple beams propagating through different optical paths through the dichroic coating 40. A beam input into the composite waveguide 30 is split into a plurality of beams by the dichroic coating 40, and optical paths of the plurality of beams have different lengths. That is, the beam input into the composite waveguide 30 may be split into multiple wavefronts by the dichroic coating 40.

A plurality of beams separated in the composite waveguide 30 may be mixed with each other while having different phase shift values. For example, multiple wavefronts generated by the dichroic coating 40 may be mixed with each other while being totally reflected inside the composite waveguide 30. A beam propagated inside the composite waveguide 30 through total internal reflection may be output from the composite waveguide 30 through the second optical element 20, as described below.

The dichroic coating 40 may separate a beam into a plurality of wavefronts. According to an example embodiment, mixing of the plurality of wavefronts with different intensity levels and/or wavelengths may occur. For example, the composite waveguide 30 may mix the plurality of wavefronts with different intensity levels and/or wavelengths. The plurality of mixed wavefronts may be output from the composite waveguide 30. Accordingly, the homogeneity of an output beam may be improved, speckle contrast may be reduced, and a desired beam cross-sectional shape of the output beam from the beam expander 100 may be formed.

The dichroic coating 40 may be provided at the interface between the plurality of waveguide elements 30a and 30b included in the composite waveguide 30, and may have a structure in which a plurality of thin layers including an optically transparent dielectric material are stacked. However, the disclosure is not limited thereto, and the dichroic coating 40 may include a single-layer structure. The dichroic coating 40 may be a reflective coating. For example, the dichroic coating 40 may be in the form of a metalized film or an oxide film. Furthermore, the dichroic coating 40 may include an antireflective, spectrally selective, and partially transmitting coating. The dichroic coating 40 may be formed by sputtering or chemical vapor deposition.

The dichroic coating 40 may redistribute a beam between the plurality of waveguide elements 30a, 30b. Accordingly, an output beam output from the second optical element 20 may have a predetermined degree of homogeneity, shape, and dimension. In other words, as a beam propagating in a plurality of traveling paths is generated in the composite waveguide 30 including the plurality of waveguide elements 30a and 30b, more efficient energy redistribution is possible between the plurality of waveguide elements 30a and 30b, and thus, the beam may be homogenized more efficiently. In this way, the composite waveguide 30 may cause a beam to exhibit various intensity profiles. Accordingly, the beam expander 100 may not need to include a plurality of light sources that emit beams exhibiting various intensity distributions.

According to an example embodiment, by providing the stacked structure of the plurality of waveguide elements 30a and 30b in the composite waveguide 30, mixing of multiple wavefronts (energy redistribution among the plurality of waveguide elements 30a and 30b) may be made more efficiently and the homogeneity of the output beam may be improved. Also, by stacking the plurality of waveguide elements 30a and 30b (e.g., two waveguide elements), the dimension (e.g., length) of the composite waveguide 30 may be reduced. As the number of waveguide elements 30a and 30b included in the composite waveguide 30 increases, the length of the composite waveguide 30 may decrease.

The dichroic coating 40 may split a beam between the plurality of waveguide elements 30a and 30b, and accordingly, a more efficient subsequent mixing of beam wavefronts may be achieved. Accordingly, the efficiency of beam homogenization and speckle suppression may be increased. Also, at the same time, the overall length of the composite waveguide 30 may be reduced by splitting the beam into a plurality of separate wavefronts and redistributing the beam between the waveguide elements 30a and 30b.

The composite waveguide 30 may convert a beam having a Gaussian distribution of intensities into a beam having the same intensity distribution regardless of coordinates within a beam cross-section. Accordingly, the output beam may have high homogeneity, and speckle contrast may be reduced. This may be achieved as a beam is split into a plurality of beams by the dichroic coating 40 and the plurality of beams are mixed with each other while propagating through the interiors of the plurality of waveguide elements 30a and 30b.

According to an example embodiment, by having a configuration in which the dichroic coating 40 is provided at the interface between the plurality of waveguide elements 30a and 30b, the thickness and length of the composite waveguide 30 may be reduced, and accordingly, the beam expander 100 may be miniaturized. Accordingly, the thickness of a display device to which the beam expander 100 is applied may be reduced. The dimensions of the beam expander 100 may be determined by the dimensions and arrangement of a device in which the beam expander 100 is employed.

Each of a plurality of wavefronts generated as an incident beam is split into a plurality of beams in the composite waveguide 30 generates its own temporarily constant speckle pattern that is different from speckle patterns of other wavefronts. When a plurality of speckle patterns from a plurality of beams generated by the composite waveguide 30 are superimposed, the contrast of a speckle pattern formed on the second optical element 20 may be greatly reduced. The overall speckle pattern contrast of the second optical element 20 may be reduced by $\sqrt{n}$ times. In this case, n denotes the number of beams formed in the composite waveguide 30. The speckle formation of an output beam from the second optical element 20 may be reduced by up to 80% by the composite waveguide 30.

The first optical element 10 and/or the second optical element 20 may be implemented as a holographic optical element (HOE). Alternatively, the first optical element 10 and/or the second optical element 20 may be implemented as a diffractive optical element (DOE).

The diffractive optical element (DOE) and the holographic optical element (HOE) are based on substantially the same physical principle. That is, these two optical elements may be referred to as substantially diffractive optical elements. However, the DOE is different from the HOE in that the DOE is an optical element in which diffraction occurs in a surface relief, whereas the HOE is a volume Bragg's grating in which diffraction occurs within a material in the HOE due to a local change in optical characteristics.

An optical element implemented as an HOE is an element that inputs a beam into the composite waveguide 30 and outputs a beam from the composite waveguide 30, and may be used to achieve miniaturization of the beam expander 100. In addition, the optical element implemented as an HOE may be used for beam collimation.

Various structures of the first optical element 10 and the second optical element 20 are described below with reference to FIGS. 4 to 7.

The first optical element 10 may be a thin layer-shaped input optical element for effectively inputting a beam to the composite waveguide 30. For example, the first optical element 10 may input a collimated incident beam to the composite waveguide 30. When the beam expander 100 is used as a component of a display device (e.g., a holographic display device), thin spectral lines of visible light corresponding to an operating wavelength of the display device may be diffracted by the first optical element 10 and input to the composite waveguide 30. Visible light that is not diffracted by the first optical element 10 may not be input to the composite waveguide 30.

The first optical element 10 may include a material that is optically transparent to a beam of a certain spectral band generated by a light source. For example, the first optical element 10 may include one of plastic, glass, resin, polymer, and photopolymer. In addition, the first optical element 10 may be implemented as one of an independent element provided separately from the composite waveguide 30, an element attached to the surface of the composite waveguide 30 or formed as a portion of the surface of the composite waveguide 30, an element integrated into the composite waveguide 30, and a reflective or transmissive optical element (a relief optical element or volume Bragg's grating (VBG)).

The second optical element 20 may be a thin layer-shaped output optical element (output optical grating) for effectively outputting a beam from the composite waveguide 30 with a desired level of collimation and a cross-section of a desired shape and dimensions in the plane of the second optical element 20. For example, the second optical element 20 may allow an output beam to have a cross-sectional shape formed by the composite waveguide 30 while maintaining coherency and collimation of the output beam.

A beam output from the second optical element 20 may not be perfectly collimated. For example, a beam output from the second optical element 20 may diverge or converge to some extent, and thus, the size of a cross-section of a beam that has reached a considerable distance may be different from the size of a cross-section of a beam at the output surface of the second optical element 20. For example, a beam output from the beam expander 100 may travel along a light path having a conical shape instead of a cylindrical shape. The light path having a conical shape may have a dimension that is measured according to an angle measure and does not exceed about 0.25° or about 15 angular minutes.

The second optical element 20 may include a material that is optically transparent to a beam of a certain spectral band generated by a light source. For example, the second optical element 20 may include one of plastic, glass, resin, polymer, and photopolymer. In addition, the second optical element 20 may be implemented as one of an independent element provided separately from the composite waveguide 30, an element attached to the surface of the composite waveguide 30 or formed as a portion of the surface of the composite waveguide 30, an element integrated into the composite waveguide 30, and a reflective or transmissive optical element (a relief optical element or VBG).

The first optical element 10 and/or the second optical element 20 may be manufactured according to a recording process of an optical grating structure. The recording process may be implemented in two ways, i.e., analog recording or digital recording.

The analog recording is a method of recording an interference pattern between a reference beam and an object beam on a photosensitive material. When one of the beams used for recording or a beam modified therefrom is irradiated onto the photosensitive material on which an interference pattern is recorded, a beam exactly the same in all parameters as a beam used for recording is emitted by diffraction in all parameters. In other words, a typical diffraction grating includes an interference pattern of two collimated beams.

Digital recording is a method of implementing an optical element by using lithography, a chemical method, a mechanical method, or any other microstructure generation technique after calculation and modeling for an optical element (e.g., a diffractive optical element or holographic optical element) necessary to generate a required beam.

A beam propagating through the composite waveguide 30 may be diffracted by the second optical element 20 and output from the composite waveguide 30, and thus, a beam used to record a hologram may be reproduced to a high degree. In addition, a beam output from the composite waveguide 30 may have a required level of collimation and a desired beam cross-sectional shape.

An output beam from the beam expander 100 may have a homogeneity of about 80% or more. For example, the homogeneity of a beam may be evaluated according to the video electronics standards association (VESA) standard for display devices and speckle pattern contrast (the ratio of speckle brightness having a minimum value to speckle brightness having a maximum value in an area having a certain size over the entire field).

The beam expander 100 may output a beam having the same homogeneity and cross-sectional shape as when various different quasi-monochromatic incident light sources are given to the input side of the beam expander 100. Also, when a beam from a coherent light source is input to the beam expander 100, the beam expander 100 may output a beam having spatial coherency and suppressed speckle contrast. In addition, the color grade of a holographic image generated by using an output beam from the beam expander 100 and beam polarization may be improved, and accordingly, a highly realistic three-dimensional image may be generated.

According to an example embodiment, the beam expander 100 may include a first optical element 10 and a second optical element 20, which are implemented as holographic optical elements, and an composite waveguide 30 having a length of about 45 mm, which includes three waveguide elements respectively having thicknesses of about 0.4 mm, about 0.7 mm and about 1.0 mm of the Eagle Glass brand glass. In this case, the three waveguide elements may be separated from each other by a dichroic coating 40 with a transmittance and reflectance of 1:1. A red beam and a blue beam may be input to the beam expander 100. A beam having a Gaussian energy distribution and emitted from a semiconductor laser diode having a diameter of about 9 mm may be converted into a beam having a square cross-section of about 5×5 mm, which includes a red beam with about 75% homogeneity and about 82% speckle reduction and a blue beam with about 67% homogeneity and about 79% speckle reduction. In this way, a high level of beam homogeneity may be achieved at the output side of the beam expander 100, and a collimated beam having a significantly reduced speckle pattern contrast and a desired cross-sectional shape and size may be output from the beam expander 100.

Figure 2:
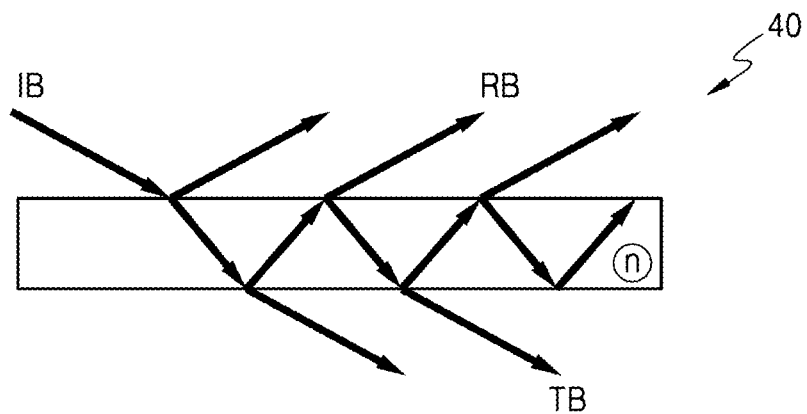
FIG. 2 schematically illustrates a principle of operation for an incident beam of a dichroic coating of FIG. 1.
Figure 3:
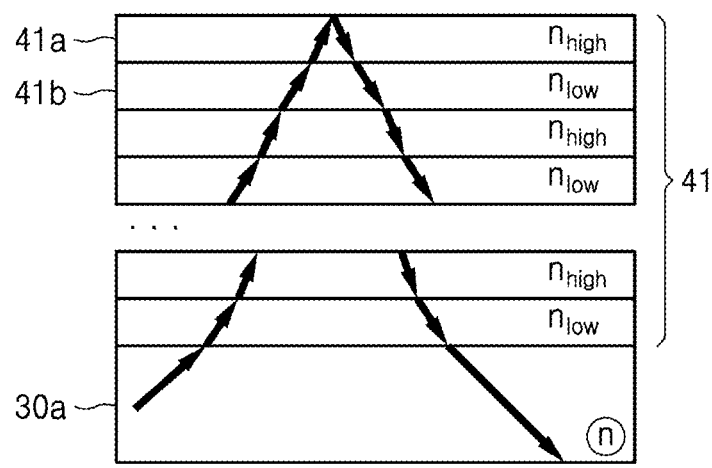
FIG. 3 schematically illustrates an example structure of a dichroic coating according to another example embodiment, which may be applied to the beam expander of FIG. 1.

FIG. 2 schematically illustrates a principle of operation for an incident beam IB of the dichroic coating 40 of FIG. 1. FIG. 3 schematically illustrates an example structure of a dichroic coating 41 according to another example embodiment, which may be applied to the beam expander 100 of FIG. 1.

Referring to FIG. 2, the incident beam IB may be incident on the dichroic coating 40 having a refractive index n. A portion of the incident beam IB may be reflected by the dichroic coating 40 to generate a reflected beam RB, and another portion may pass through the dichroic coating 40 and propagate while being totally reflected inside the dichroic coating 40. A portion of the incident beam IB, which propagates while being totally reflected inside the dichroic coating 40, may pass through the dichroic coating 40 to thereby generate a transmitted beam TB that propagates to the outside of the dichroic coating 40.

The dichroic coating 40 may include a structure in which a plurality of interference mirrors are stacked. The plurality of interference mirrors may include dielectrics having different refractive indices. Accordingly, the dichroic coating 40 may be referred to as a dielectric mirror. The dielectric-based dichroic coating 40 may have a relatively high reflectance (up to 99.9%) compared to a metal-based interference mirror. In addition, the dielectric-based dichroic coating 40 may absorb a relatively small amount of beam compared to the metal-based interference mirror, thereby greatly reducing beam loss. Furthermore, when the dichroic coating 40 having a structure in which a plurality of interference mirrors are stacked is used, limitations related to the reflectance of the metal-based interference mirror may be overcome and the operating range of a wavelength may be greatly expanded. The reflectance of each of the interference mirrors included in the stacked structure of the plurality of interference mirrors may be determined as desired. Each of the interference mirrors included in the stacked structure of the plurality of interference mirrors may have high reflectance in a certain spectral region and may be made to be substantially transparent to other spectral regions.

The effect of the stacked structure of the plurality of interference mirrors is based on multi-beam interference, which may occur when a beam is reflected at an interface of the stacked structure of the plurality of interference mirrors.

Referring to FIG. 3, the dichroic coating 41 may have a structure in which a first dielectric layer 41a having a relatively high refractive index $n_{high}$ and a second dielectric layer 41b having a relatively low refractive index $n_{low}$ are alternately stacked. In other words, the dichroic coating 41 may be a multilayer dielectric coating formed by stacking a plurality of first and second dielectric layers 41a and 41b, alternatively.

Multi-beam interference may occur due to the reflection of a beam and the interaction between beams, which are repeated several times within the plurality of waveguide elements 30a and 30b included in the composite waveguide 30. In this case, depending on the number or material of the plurality of waveguide elements 30a and 30b, some of the plurality of waveguide elements 30a and 30b included in the composite waveguide 30 may be relatively more intense or relatively less intense (depending on whether the beam is reflected/transmitted or the wavelength of the beam). According to an example embodiment, the waveguide elements 30a may have a refractive index n.

Figure 4:
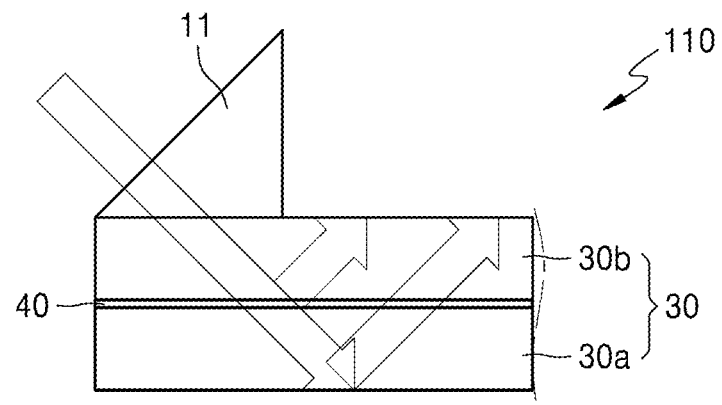
FIG. 4 schematically illustrates an example configuration of a beam expander according to another example embodiment.
Figure 5:
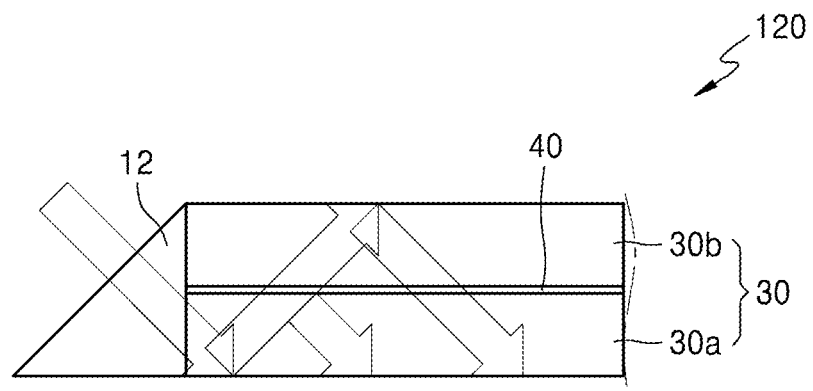
FIG. 5 schematically illustrates an example configuration of a beam expander according to another example embodiment.

FIG. 4 schematically illustrates an example configuration of a beam expander 110 according to another example embodiment. FIG. 5 schematically illustrates an example configuration of a beam expander 120 according to another example embodiment.

The beam expander 110 of FIG. 4 and the beam expander 120 of FIG. 5 may be substantially the same as the beam expander 100 of FIG. 1 except that the beam expander 110 may include a first optical element 11 and the beam expander 120 may include a first optical element 12, which have a shape different from the shape of the first optical element 10 of FIG. 1. In FIGS. 4 and 5, a second optical element having substantially the same structure as the first optical element 11 and the first optical element 12 is omitted. Regarding FIGS. 4 and 5, descriptions that are the same as those with respect to FIGS. 1 to 3 are omitted.

Referring to FIG. 4, the beam expander 110 may include the first optical element 11, a composite waveguide 30, a second optical element, and a dichroic coating 40. The composite waveguide 30 may include the plurality of waveguide elements 30a and 30b.

According to an example embodiment, the first optical element 11 may be a prism. One surface of the first optical element 11 implemented as a prism may be provided in optical contact with an upper surface of the composite waveguide 30 in order not to interfere with the propagation of a beam. In this case, the upper surface of the composite waveguide 30 refers to a surface on which a beam is incident with respect to the composite waveguide 30. Another surface of the optical element 11 in the form of a prism may be inclined at an angle that prevents total reflection of a beam in the first optical element 11, and thus, a beam may be input to the composite waveguide 30 by the first optical element 11.

Referring to FIG. 5, the beam expander 120 may include the first optical element 12, a composite waveguide 30, a second optical element, and a dichroic coating 40. The composite waveguide 30 may include the plurality of waveguide elements 30a and 30b.

According to an example embodiment, the first optical element 12 may be a prism. One surface of the first optical element 12 implemented as a prism may be provided in optical contact with a left end surface of the composite waveguide 30 in order not to interfere with the propagation of a beam. Another surface of the first optical element 12 in the form of a prism may be inclined at an angle that prevents total reflection of a beam in the first optical element 12, and thus, a beam may be input to the composite waveguide 30 by the first optical element 12.

Figure 6:
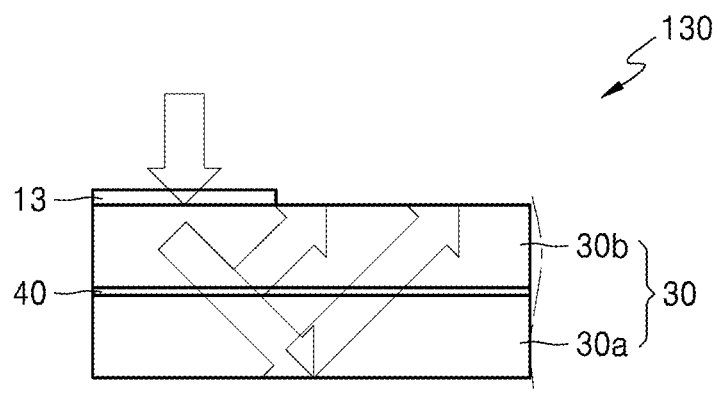
FIG. 6 schematically illustrates an example configuration of a beam expander according to another example embodiment.
Figure 7:
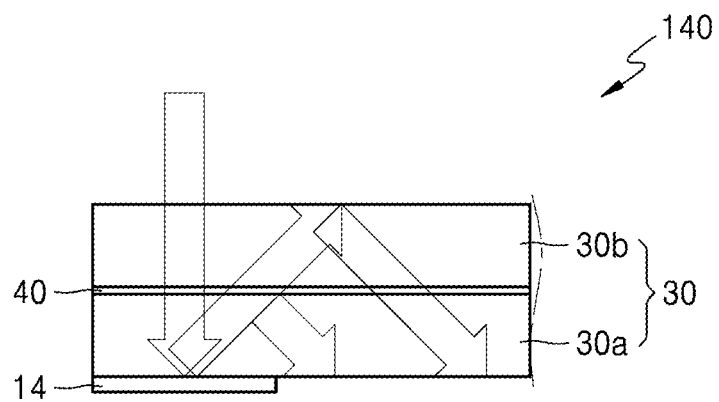
FIG. 7 schematically illustrates an example configuration of a beam expander according to another example embodiment.

FIG. 6 schematically illustrates an example configuration of a beam expander 130 according to another example embodiment. FIG. 7 schematically illustrates an example configuration of a beam expander 140 according to another example embodiment.

The beam expander 130 of FIG. 6 and the beam expander 140 of FIG. 7 may be substantially the same as the beam expander 100 of FIG. 1 except that the beam expander 130 may include a first optical element 13 and the beam expander 140 may include a first optical element 14, which have a shape different from the shape of the first optical element 10 of FIG. 1. In FIGS. 6 and 7, a second optical element having substantially the same structure as the first optical element 13 and the first optical element 14 is omitted. Regarding FIGS. 6 and 7, descriptions that are the same as those with respect to FIGS. 1 to 3 are omitted.

Referring to FIG. 6, the beam expander 130 may include the first optical element 13, a composite waveguide 30, a second optical element, and a dichroic coating 40. The composite waveguide 30 may include the plurality of waveguide elements 30a and 30b.

The first optical element 13 may be a transmissive holographic optical element. The transmissive holographic optical element may be a substantially flat optical element having a complex structure. The complex structure of the transmissive holographic optical element may include a surface relief, a microstructure (e.g., a bubble, a structure including particles of other materials, etc.), or a size comparable to the operating wavelength of a beam, and may include optical irregularities within the material formed by way of mechanical, thermal, or chemical effects.

The first optical element 13 implemented as a transmissive holographic optical element may be provided in optical contact with an upper surface of the composite waveguide 30. In this case, the upper surface of the composite waveguide 30 refers to a surface on which a beam is incident with respect to the composite waveguide 30.

Referring to FIG. 7, the beam expander 140 may include the first optical element 14, a composite waveguide 30, a second optical element, and a dichroic coating 40. The composite waveguide 30 may include the plurality of waveguide elements 30a and 30b.

The first optical element 14 may be a reflective holographic optical element. The reflective holographic optical element may be a substantially flat optical element having a complex structure. The complex structure of the reflective holographic optical element may include a surface relief, a microstructure (e.g., a bubble, a structure including particles of other materials, etc.), or a size comparable to the operating wavelength of a beam, and may include optical irregularities within the material formed by way of mechanical, thermal, or chemical effects.

The first optical element 14 implemented as a reflective holographic optical element may be provided in optical contact with a lower surface of the composite waveguide 30. In this case, the lower surface of the composite waveguide 30 refers to a surface facing the upper surface of the composite waveguide 30.

Figure 8:
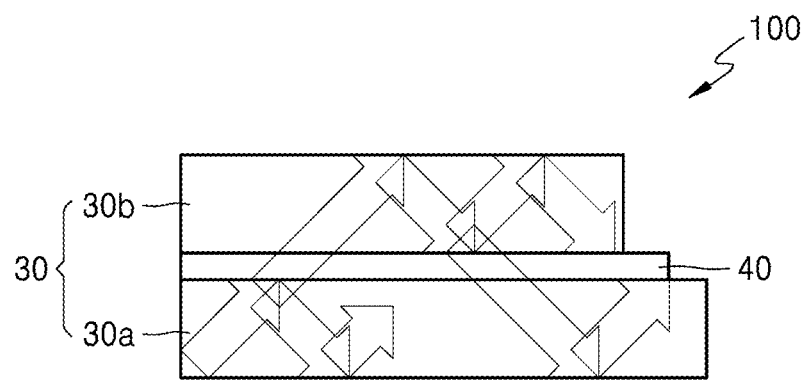
FIG. 8 is a diagram illustrating a state in which, in the beam expander of FIG. 1, when incident beams are continuously redistributed and mixed, an incident beam is split based on power between a plurality of waveguide elements included in a composite waveguide.

FIG. 8 is a diagram illustrating a state in which, in the beam expander 100 of FIG. 1, when incident beams are continuously redistributed and mixed, an incident beam is split based on power between a plurality of waveguide elements 30a and 30b included in a composite waveguide 30.

Referring to FIG. 8, a beam may be split between the plurality of waveguide elements 30a and 30b included in the composite waveguide 30, and continuous redistribution and mixing of a plurality of beams generated by splitting may be performed. This may be achieved by multiple total internal reflection of the beam in the composite waveguide 30. In this case, the dichroic coating 40 provided on the interface between the plurality of waveguide elements 30a and 30b included in the composite waveguide 30 transmits a portion of the beam and reflects the other portion of the beam.

In this way, a beam may be split according to power between the plurality of waveguide elements 30a and 30b included in the beam expander 100, and continuous redistribution and mixing of a plurality of beams generated by splitting may be performed. Accordingly, because beams are more strongly mixed in the beam expander 100, the beam expander 100 may be more efficient and compact. Also, the beam expander 100 may be more suitable for monochromatic light.

Figure 9:
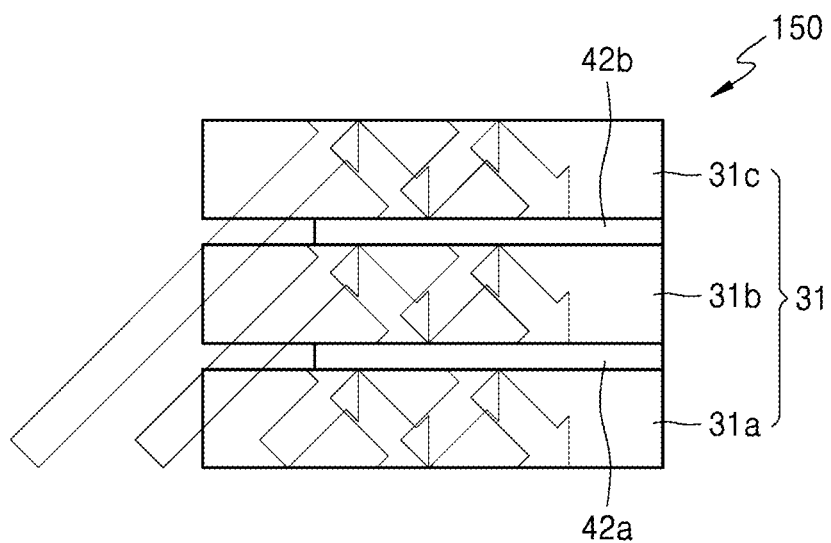
FIG. 9 schematically illustrates an example configuration of a beam expander according to another example embodiment.

FIG. 9 schematically illustrates an example configuration of a beam expander 150 according to another example embodiment. For convenience of description, a first optical element and a second optical element are omitted in FIG. 9.

Referring to FIG. 9, the beam expander 150 may include a composite waveguide 31 including a plurality of waveguide elements 31a, 31b, and 31c, and a plurality of dichroic coatings 42a and 42b each provided between each two of the interfaces of the plurality of waveguide elements 31a, 31b, and 31c. For example, the plurality of dichroic coatings may include a first dichroic coating 42a provided between a first waveguide element 31a and a second waveguide element 31b adjacent to each other among the plurality of waveguide elements 31a, 31b, and 31c, and a second dichroic coating 42b provided between the second waveguide element 31b and a third waveguide element 31c adjacent to each other among the plurality of waveguide elements 31a, 31b, and 31c.

The transmittance and reflectance of the first dichroic coating 42a in the beam expander 150 may be different from those of the second dichroic coating 42b in the beam expander 150. The transmittance and reflectance of the first dichroic coating 42a and the transmittance and reflectance of the second dichroic coating 42b may be appropriately selected to achieve a required total efficiency of the beam expander 150. For example, the transmittance of the first dichroic coating 42a may be different from that of the second dichroic coating 42b. Also, the reflectance of the first dichroic coating 42a may be different from that of the second dichroic coating 42b.

A beam input to the composite waveguide 31 by a first optical element may be split between the plurality of waveguide elements 31a, 31b, and 31c according to power. Also, beams generated by splitting according to power may be mixed by the plurality of waveguide elements 31a, 31b, and 31c at the output side of the composite waveguide 31. For example, the composite waveguide 31 may include three waveguide elements 31a, 31b, and 31c. For example, the composite waveguide 31 may include a structure in which a first waveguide element 31a, a second waveguide element 31b, and a third waveguide element 31c are stacked. In addition, the plurality of dichroic coatings 42a and 42b may be provided at the interfaces of the three waveguide elements 31a, 31b, and 31c.

The plurality of dichroic coatings 42a and 42b may be arranged at each of the interfaces between the plurality of waveguide elements 31a, 31b, and 31c. In this case, the plurality of dichroic coatings 42a and 42b may not transmit a beam propagating in each of the plurality of waveguide elements 31a, 31b, and 31c. Beams may be mixed near an end of the composite waveguide 31 before being output from the composite waveguide 31 in a plane of the second optical element.

A configuration in which a beam is split between the plurality of waveguide elements 31a, 31b, and 31c according to power and a plurality of beams generated by splitting are mixed by the plurality of waveguide elements 31a, 31b, and 31c at the output side of the composite waveguide 31 is easy to implement, and may be economical when applied to mass production devices such as display devices and TVs.

Figure 10:
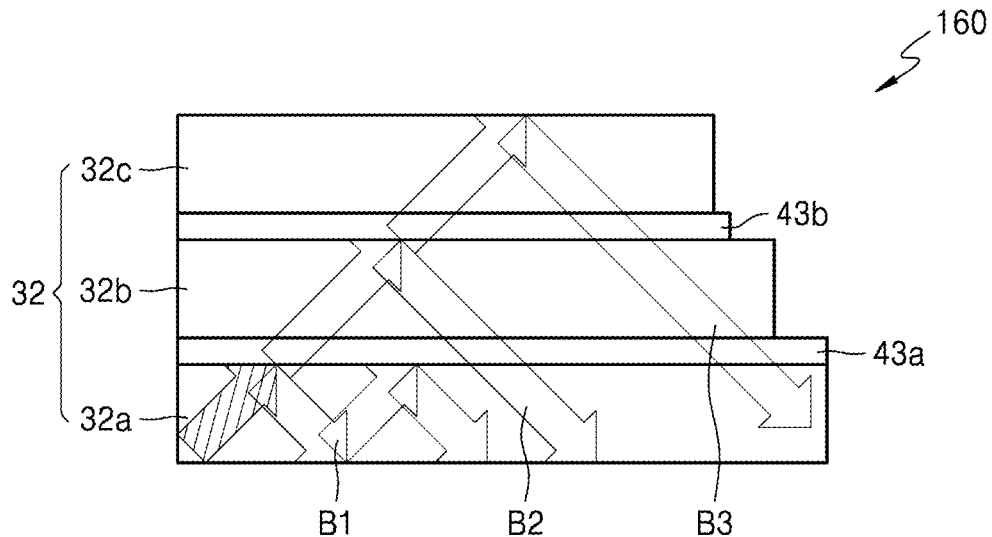
FIG. 10 schematically illustrates an example configuration of a beam expander according to another example embodiment.

FIG. 10 schematically illustrates an example configuration of a beam expander 160 according to another example embodiment.

Referring to FIG. 10, the beam expander 160 may include a composite waveguide 32 including a plurality of waveguide elements 32a, 32b, and 32c, and a plurality of dichroic coatings 43a and 43b each provided between each two of the interfaces of the plurality of waveguide elements 32a, 32b, and 32c. For example, the plurality of dichroic coatings may include a first dichroic coating 43a provided between a first waveguide element 32a and a second waveguide element 32b adjacent to each other among the plurality of waveguide elements 32a, 32b, and 32c, and a second dichroic coating 43b provided between the second waveguide element 32b and a third waveguide element 32c adjacent to each other among the plurality of waveguide elements 32a, 32b, and 32c.

The transmittance and reflectance of the first dichroic coating 43a in the beam expander 160 may be different from those of the second dichroic coating 43b in the beam expander 160. The transmittance and reflectance of the first dichroic coating 43a and the transmittance and reflectance of the second dichroic coating 43b may be appropriately selected to achieve a required total efficiency of the beam expander 160. For example, the transmittance of the first dichroic coating 43a may be different from that of the second dichroic coating 43b. Also, the reflectance of the first dichroic coating 43a may be different from that of the second dichroic coating 43b.

Referring to FIG. 10, a beam may be split between the plurality of waveguide elements 32a, 32b, and 32c according to wavelengths. For example, the composite waveguide 32 may include three waveguide elements 32a, 32b, and 32c. For example, the composite waveguide 32 may include a structure in which a first waveguide element 32a, a second waveguide element 32b, and a third waveguide element 32c are stacked. In addition, the plurality of dichroic coatings 43a, 43b may be provided at the interfaces of the three waveguide elements 32a, 32b, and 32c.

For example, the first dichroic coating 43a may be provided between the first waveguide element 32a and the second waveguide element 32b. A red spectral beam B1 may not be transmitted by the first dichroic coating 43a and may propagate through total reflection inside the first waveguide element 32a. In addition, the second dichroic coating 43b may be provided between the second waveguide element 32b and the third waveguide element 32c. A green spectral beam B2 may be transmitted through the first dichroic coating 43a and may not be transmitted by the second dichroic coating 42b. The green spectral beam B2 may propagate through total reflection inside the first waveguide element 32a and the second waveguide element 32b. Furthermore, a blue spectrum beam B3 may be transmitted through the first dichroic coating 43a and the second dichroic coating 43b. The blue spectral beam B3 may propagate through total reflection inside the first waveguide element 32a, the second waveguide element 32b, and the third waveguide element 32c. In this case, total reflection of a beam may not occur between the plurality of dichroic coatings 43a and 43b provided between the plurality of waveguide elements 32a, 32b, and 32c, but between the upper and lower outer surfaces of the composite waveguide 32.

The example embodiment of FIG. 10, in which a beam is split between the plurality of waveguide elements 32a, 32b, and 32c according to wavelength requires a slightly larger size of the composite waveguide 32 compared to other example embodiments in which a beam is split according to power as illustrated in FIG. 8. However, the example embodiment illustrated in FIG. 10 has the advantage of being able to be used for several wavelengths.

The various beam expanders 100, 110, 120, 130, 140, 150, and 160 described with reference to FIGS. 1 to 10 may each include at least one light source. The at least one light source may be defined by the concepts of the beam expanders 100, 110, 120, 130, 140, 150, and 160 itself and the whole system. Each of the beam expanders 100, 110, 120, 130, 140, 150, and 160 may be a portion of a certain application. According to various example embodiments of the disclosure, each of the beam expanders 100, 110, 120, 130, 140, 150, and 160 may use an external light source, and may be used as separate devices applied to laboratory benches, metrology, and end-user devices (e.g., display device, augmented reality glasses, or virtual reality glasses). According to various example embodiments of the disclosure, a light source may be integrated into each of the beam expander 100, 110, 120, 130, 140, 150, and 160, and each of the beam expander 100, 110, 120, 130, 140, 150, and 160 may be used in a user device to standardize hardware components.

According to various example embodiments of the disclosure, a light source provided outside each of the beam expanders 100, 110, 120, 130, 140, 150, and 160 or integrated into each of the beam expanders 100, 110, 120, 130, 140, 150, and 160 may be, for example, a laser diode. The laser diode produces a coherent collimated beam having a certain intensity distribution in a plane of a first optical element. However, the disclosure is not limited thereto, and as such, according to various example embodiments of the disclosure, a light source providing an incident beam to each of the beam expanders 100, 110, 120, 130, 140, 150, and 160 may be any source (e.g., a light-emitting diode (LED) or an organic light-emitting diode (OLED)) having a narrow spectral band other than a laser light source. However, a light source providing an incident beam to each of the beam expanders 100, 110, 120, 130, 140, 150, and 160 according to various example embodiments of the disclosure is not limited to the above examples. For example, the light source may be a gas discharge lamp that produces a beam having several narrow spectral lines.

According to an example embodiment of the disclosure, a coherent collimated beam (e.g., a laser beam) having an intensity of a Gaussian distribution may be incident on the first optical element included in each of the beam expanders 100, 110, 120, 130, 140, 150, and 160. Also, an incident beam may be split into a plurality of beams within a composite waveguide included in each of the beam expanders 100, 110, 120, 130, 140, 150, and 160 according to various example embodiments of the disclosure. The plurality of beams obtained by splitting within the composite waveguide may each have a beam pattern necessary to maintain energy of the incident beam.

While a beam propagates through the composite waveguide included in each of the beam expanders 100, 110, 120, 130, 140, 150, and 160 according to various embodiments of the disclosure, a plurality of beams (wavefronts) are mixed to obtain a high level of beam homogeneity, and the plurality of beams arrive at a second optical element with an increased incident area. The second optical element has a cross-section with a desired shape and combines all mixed beams propagated to one point through the composite waveguide, and outputs a combined beam from the composite waveguide. A beam output by the second optical element may have a high level of collimation and homogeneity, and a desired cross-sectional shape and low speckle contrast. A beam in a plane of the second optical element may have a cross-section with a shape and size substantially corresponding to the shape and size of the second optical element. Accordingly, the size of the cross-section of the beam does not exceed the size of the plane of the second optical element, and accordingly, illumination by a collimated output beam may have high efficiency.

According to various example embodiments of the disclosure, each of the beam expanders 100, 110, 120, 130, 140, 150, and 160 may include a plurality of (two or more) waveguide elements and a dichroic coating provided between each two thereof. According to this structure, the degree of homogeneity of an output beam from each of the beam expanders 100, 110, 120, 130, 140, 150, and 160 may increase by about 80% or more, and speckle contrast may decrease. This is because each of the beam expanders 100, 110, 120, 130, 140, 150, and 160 converts a beam having a Gaussian distribution into a beam having the same intensity distribution regardless of the coordinates of a beam cross-section. In this way, an incident beam from one light source, such as a laser diode, may be split into a plurality of beams. The plurality of beams may respectively serve as a plurality of secondary light sources. In addition, by including the composite waveguide in each of the beam expanders 100, 110, 120, 130, 140, 150, and 160, a beam having a Gaussian distribution is converted into a beam having a constant intensity distribution regardless of the coordinates of the cross-section of the beam, and thus, the homogeneity of light may be improved. Furthermore, because beams from the plurality of secondary light sources formed by splitting the incident beam propagate through the composite waveguide and are mixed, speckle of the beams may be removed.

According to various example embodiments of the disclosure, depending on a given use of each of the beam expanders 100, 110, 120, 130, 140, 150, and 160, a beam may be output to the outside of each of the beam expanders 100, 110, 120, 130, 140, 150, and 160. An output beam from each of the beam expanders 100, 110, 120, 130, 140, 150, and 160 may be directed to other devices provided externally, such as a turning element such as a lens or mirror. Also, the output beam from each of the beam expanders 100, 110, 120, 130, 140, 150, and 160 may be directly illuminated on a screen, liquid crystal panel, matrix generating an image, or the like.

According to various example embodiments of the disclosure, the beam expanders 100, 110, 120, 130, 140, 150, and 160 may be used as lighting units for generating holographic and/or three-dimensional images in other applications. For example, the beam expanders 100, 110, 120, 130, 140, 150, and 160 may be used in different display devices such as displays and television sets. The beam expanders 100, 110, 120, 130, 140, 150, and 160 may be used to generate images in an augmented reality (AR) or virtual reality (VR) system for various applications, a helmet-mounted display device, a vehicle head-up display, a system for projecting information onto a vehicle windscreen, a fingerprint scanner, and the like. The fields of application of the beam expanders 100, 110, 120, 130, 140, 150, and 160 are merely examples and are not limited thereto.

Figure 11:
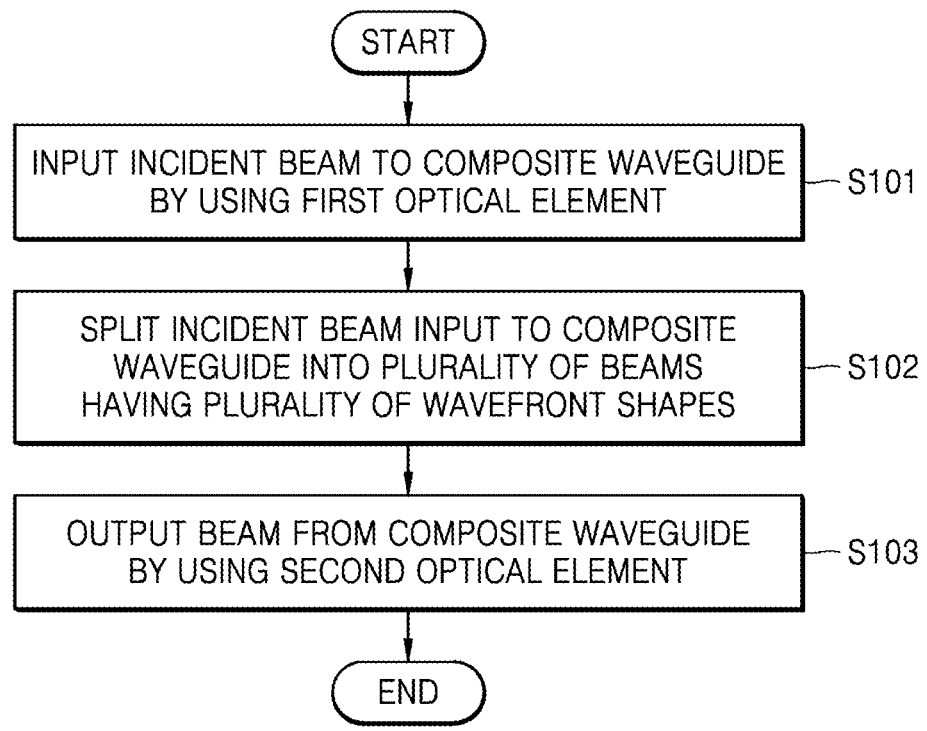
FIG. 11 is a flowchart illustrating a beam expansion method according to an example embodiment.

FIG. 11 is a flowchart illustrating a beam expansion method according to an example embodiment. The beam expansion method of FIG. 11 is described with reference to the structure of the beam expander 100 of FIG. 1.

Referring to FIG. 11, the beam expansion method according to an embodiment may include inputting an incident beam to the composite waveguide 30 (operation S101), splitting the incident beam input to the composite waveguide 30 into a plurality of beams having a plurality of wavefront shapes (operation S102), and outputting a beam from the composite waveguide 30 (operation S103).

In operation S101, a collimated coherent incident beam is input to the composite waveguide 30 by the first optical element 10. In one or more example embodiments, the coherent incident beam may be a laser beam having one of different electric field and beam distribution cross-sectional profiles.

In operation S102, the incident beam travels towards a plane of the second optical element 20 through the composite waveguide 30. In this case, a beam directed from the first optical element 10 to the second optical element 20 travels while being totally reflected inside the composite waveguide 30 in the form of a plurality of wavefronts. A plurality of wavefronts of the incident beam are formed as the incident beam is split according to intensity, wavelength, phase, and the like. Beams generated by splitting into several wavefronts are propagated while being mixed through the composite waveguide 30, and thus, beam homogeneity may increase.

In operation S103, a coherent beam is output from the composite waveguide 30 by the second optical element 20.

According to various example embodiments of the disclosure, there may be provided a beam expander and a beam expansion method capable of maintaining coherency and collimation of an output beam and reducing speckle.

According to various example embodiments of the disclosure, there may be provided a beam expander and beam expansion method for improving the homogenization of an output beam, ensuring the output beam has a certain cross-section with a predetermined shape and dimensions, reducing speckle contrast, and maintaining coherency of the output beam, and for producing the same effect as using a plurality of light sources without any special adjustment for a given light source.

It should be understood that example embodiments described herein should be considered in a descriptive sense only and not for purposes of limitation. Descriptions of features or aspects within each embodiment should typically be considered as available for other similar features or aspects in other example embodiments. While one or more example embodiments have been described with reference to the figures, it will be understood by those of ordinary skill in the art that various changes in form and details may be made therein without departing from the spirit and scope as defined by the following claims and their equivalents.

What is claimed is:

1. A beam expander comprising:
   a first optical element;
   a second optical element;
   a composite waveguide including a plurality of waveguide elements each having a form of a substrate; and
   a dichroic coating provided between the plurality of waveguide elements,
   wherein the first optical element is configured to input a collimated incident beam from outside the beam expander into the composite waveguide, and the second optical element is configured to output, from the composite waveguide, the collimated incident beam, input to the composite waveguide, wherein the collimated incident beam input into the composite waveguide is divided into a plurality of wavefronts by the dichroic coating, and the plurality of wavefronts are mixed by total internal reflection in the composite waveguide.

2. The beam expander of claim 1, wherein the second optical element is configured to output, from the composite waveguide, a beam having a specific cross-sectional shape and beam homogeneity in a collimated state with coherency.

3. The beam expander of claim 1, wherein at least one of the first optical element or the second optical element includes a diffractive optical element.

4. The beam expander of claim 1, wherein at least one of the first optical element or the second optical element includes a holographic optical element.

5. The beam expander of claim 1, further comprising at least one light source.

6. The beam expander of claim 5, wherein the at least one light source includes a laser diode.

7. The beam expander of claim 1, wherein at least one of the first optical element or the second optical element includes a volume Bragg's grating.

8. The beam expander of claim 1, wherein the dichroic coating has a multilayer dielectric coating structure.

9. The beam expander of claim 1, wherein the dichroic coating has a multilayer interference mirror structure.

10. The beam expander of claim 1, wherein the plurality of waveguide elements comprises:
a first waveguide element;
a second waveguide element adjacent to the first waveguide element; and
a third waveguide element adjacent to the second waveguide element, and
wherein the dichroic coating comprises:
a first dichroic coating provided between the first waveguide element and the second waveguide element; and
a second dichroic coating provided between the second waveguide element and the third waveguide element.

11. The beam expander of claim 10, wherein a transmittance characteristic of the first dichroic coating is different from a transmittance characteristic of the second dichroic coating.

12. The beam expander of claim 10, wherein a reflectance characteristic of the first dichroic coating is different from a reflectance characteristic of the second dichroic coating.

13. A beam expansion method comprising:
inputting a collimated incident beam into a composite waveguide through a first optical element;
dividing the collimated incident beam into a plurality of wavefronts inside the composite waveguide, and mixing the plurality of wavefronts through total reflection in the composite waveguide; and
outputting a beam, obtained by mixing the plurality of wavefronts inside the composite waveguide, from the composite waveguide through a second optical element.

14. The beam expansion method of claim 13, wherein the beam has a specific cross-sectional shape and beam homogeneity in a collimated state with coherency.

15. The beam expansion method of claim 13, wherein at least one of the first optical element or the second optical element includes a diffractive optical element.

16. The beam expansion method of claim 13, wherein at least one of the first optical element or the second optical element includes a holographic optical element.

17. The beam expansion method of claim 13, wherein the beam output from the composite waveguide travels with a divergence angle of less than about 0.25°.

18. A beam expander comprising:
a first optical element configured to receive a collimated incident beam;
a composite waveguide configured to:
receive the collimated incident beam through the first optical element,
divide the collimated incident beam into a plurality of wavefronts, and
mix the plurality of wavefronts through total reflection in the composite waveguide; and
a second optical element configured to output a beam obtained by mixing the plurality of wavefronts inside the composite waveguide.

19. The beam expander of claim 18, comprising a plurality of waveguide elements arranged in a stacked structure.

20. The beam expander of claim 19, comprising a dichroic coating provided between adjacent waveguide elements among the plurality of waveguide elements.

* * * * *